S. SMITH.
SANITARY WATER CLOSET.
APPLICATION FILED FEB. 14, 1908.

932,823.

Patented Aug. 31, 1909.

WITNESSES.
Henry Marsh Jr.
L. B. Dyer

INVENTOR.
Sheffield Smith
per S. Schofield
ATTORNEY.

UNITED STATES PATENT OFFICE.

SHEFFIELD SMITH, OF PROVIDENCE, RHODE ISLAND.

SANITARY WATER-CLOSET.

932,823.

Specification of Letters Patent. Patented Aug. 31, 1909.

Application filed February 14, 1908. Serial No. 415,986.

*To all whom it may concern:*

Be it known that I, SHEFFIELD SMITH, a citizen of the United States, residing at Providence, in the State of Rhode Island, have invented a new and useful Improvement in Sanitary Water-Closets, of which the following is a specification.

The nature of my invention consists in the combination with a water closet, of a conduit for receiving the excrement, and means for heating the said conduit and the contained excrement for sterilization in its flowing passage through the conduit.

Figure 1:
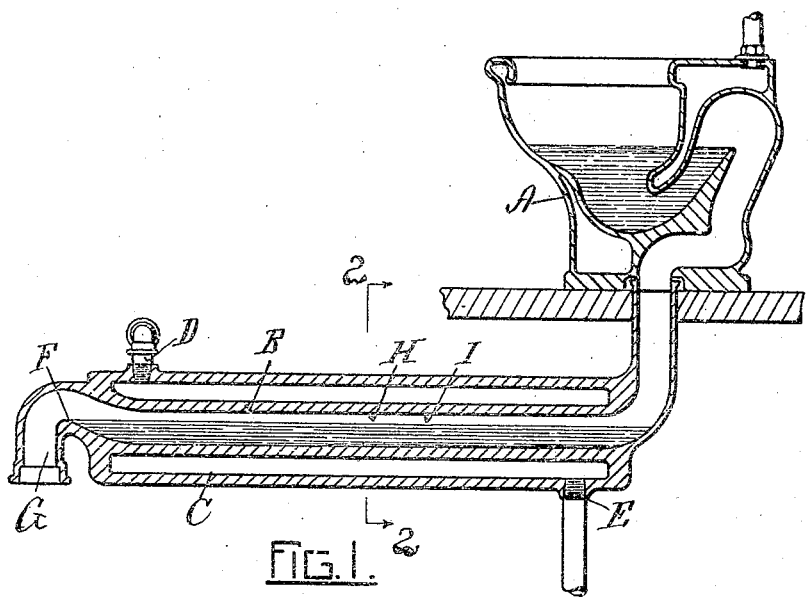
Figure 2:
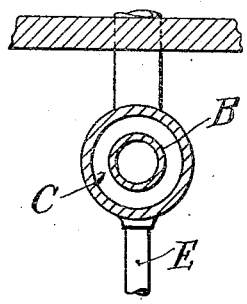

In the accompanying drawing: Figure 1 represents an axial section of a water closet provided with my improvement. Fig. 2 represents a section taken in the line 2, 2 of Fig. 1.

In the drawing, A represents the water closet, and B the conduit into which the excrement deposited in the closet is made to pass.

C is a steam jacket, surrounding the conduit B, into which steam or other heating fluid is made to pass from the inlet pipe D, the water of condensation from the steam is to be discharged through the pipe E.

The height of the riffle F, formed by the curved bottom of the conduit B is preferably so arranged that a free space H, will be left between the surface of the excrementitious deposit I, and the top of the conduit, in order that the solid matter may flow along without material obstruction. The length of the conduit is to be such as to insure the sterilization of the excreta in its flowing passage through the same.

I do not limit my invention to the employment of a circulating fluid as a heating means for it is evident that the conduit may be heated by means of coal, gas, electricity, or otherwise, without departing from the spirit of my invention, which consists in heating the excrementitious deposit from a water closet in an elongated passage or conduit, by heating the conduit through which the excremental matter flows.

I claim as my invention:

1. The combination of a water closet, with a conduit adapted for the flow of the excrement therethrough and means for heating the conduit, whereby the excrement from the closet will be heated in its passage through the conduit and sterilized.

2. The combination of a water closet, with a conduit adapted for the flow of the excrement therethrough, means for heating the conduit, and a riffle for holding back the excrement in the conduit until it is heated and sterilized.

SHEFFIELD SMITH.

Witnesses:
 SOCRATES SCHOLFIELD,
 BENJAMIN L. DENNIS.